(12) United States Patent
Allen et al.

(10) Patent No.: US 9,095,122 B2
(45) Date of Patent: Aug. 4, 2015

(54) ACOUSTIC TAG HAVING A DIGESTIBLE FUSE

(71) Applicant: Hydroacoustic Technology Inc., Seattle, WA (US)

(72) Inventors: William W. Allen, Lake Stevens, WA (US); Scott E. Hemmings, Seattle, WA (US); Samuel V. Johnson, Seattle, WA (US)

(73) Assignee: HYDROACOUSTIC TECHNOLOGY INC., Seattle, WA (US)

( * ) Notice: Subject to any disclaimer, the term of this patent is extended or adjusted under 35 U.S.C. 154(b) by 352 days.

(21) Appl. No.: 13/751,408

(22) Filed: Jan. 28, 2013

(65) Prior Publication Data

US 2014/0211594 A1 Jul. 31, 2014

(51) Int. Cl.
*G01S 3/80* (2006.01)
*A01K 11/00* (2006.01)
*H04B 11/00* (2006.01)
*A01K 61/00* (2006.01)

(52) U.S. Cl.
CPC ............ *A01K 11/006* (2013.01); *A01K 61/001* (2013.01); *G01S 3/80* (2013.01); *H04B 11/00* (2013.01)

(58) Field of Classification Search
USPC ........................................................ 367/139
See application file for complete search history.

(56) References Cited

U.S. PATENT DOCUMENTS

| | | | | |
|---|---|---|---|---|
| 3,216,411 | A * | 11/1965 | Testu et al. | 600/302 |
| 4,461,241 | A * | 7/1984 | Ostler | 119/51.02 |
| 4,854,328 | A * | 8/1989 | Pollack | 600/549 |
| 5,483,767 | A * | 1/1996 | Langer | 43/4 |
| 5,581,930 | A * | 12/1996 | Langer | 43/17 |
| 5,634,432 | A * | 6/1997 | O'Grady et al. | 119/174 |
| 7,487,614 | B1 * | 2/2009 | Walker et al. | 43/10 |
| 2002/0010390 | A1 * | 1/2002 | Guice et al. | 600/300 |
| 2008/0112885 | A1 * | 5/2008 | Okunev et al. | 424/9.1 |
| 2008/0146871 | A1 * | 6/2008 | Arneson et al. | 600/101 |

\* cited by examiner

*Primary Examiner* — James Hulka
(74) *Attorney, Agent, or Firm* — Lowe Graham Jones PLLC

(57) ABSTRACT

Acoustic tags have been used for years in fisheries research to study survival and behavior of fish in various aquatic environments. The described techniques, devices and systems enhance the ability of researchers to understand the effect on fish mortality by predators through an acoustic tag that includes a digestible fuse. When the implanted acoustic tag comes in contact with the digestive fluids in a predator's stomach, the fuse coating is dissolved causing the fuse to disintegrate and result in an open circuit. The open circuit in turn signals the electronics in the acoustic tag that the tagged fish has been consumed. In response, the electronics alter the tag transmit signal to indicate that predation has occurred.

18 Claims, 11 Drawing Sheets

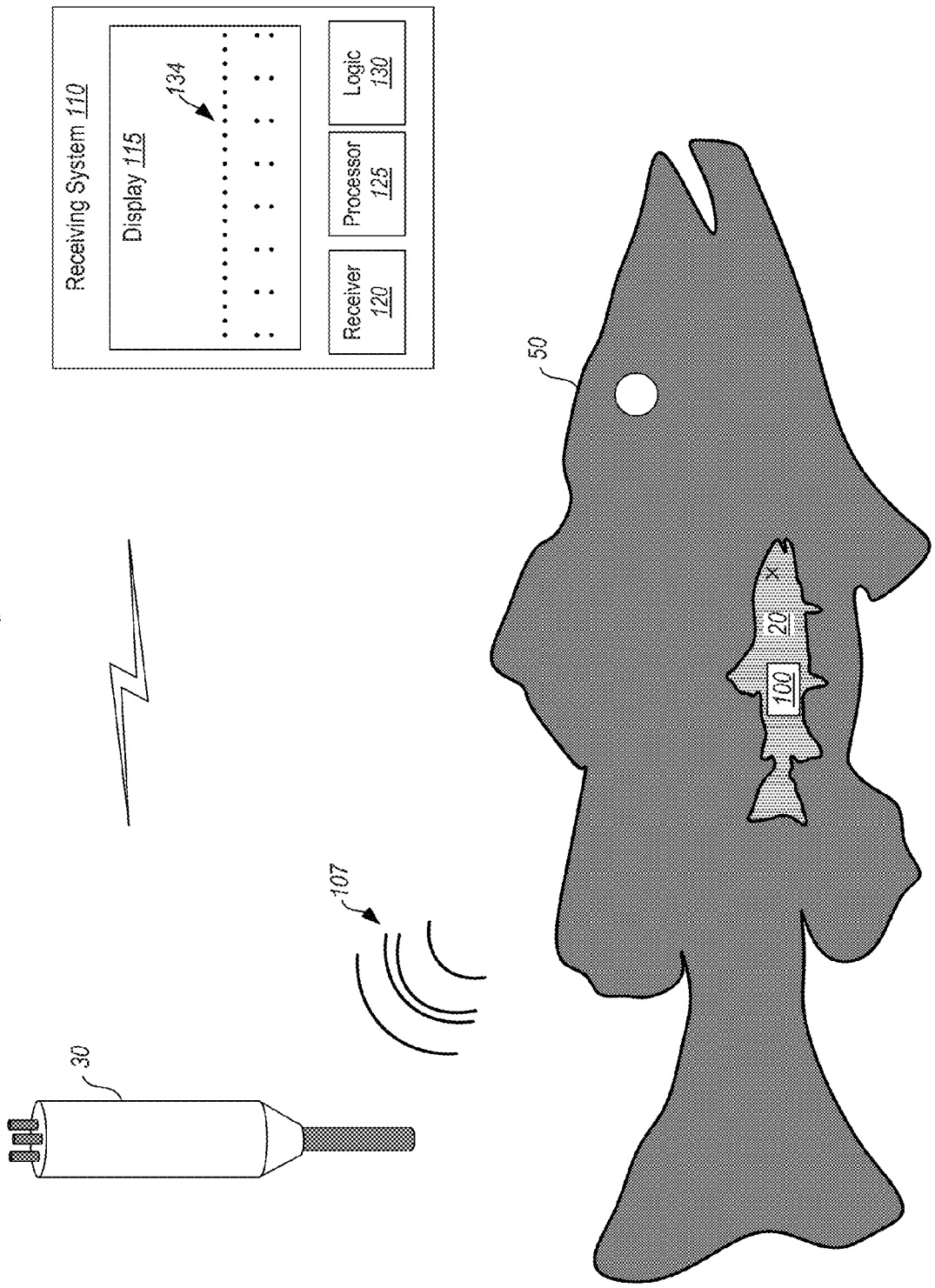

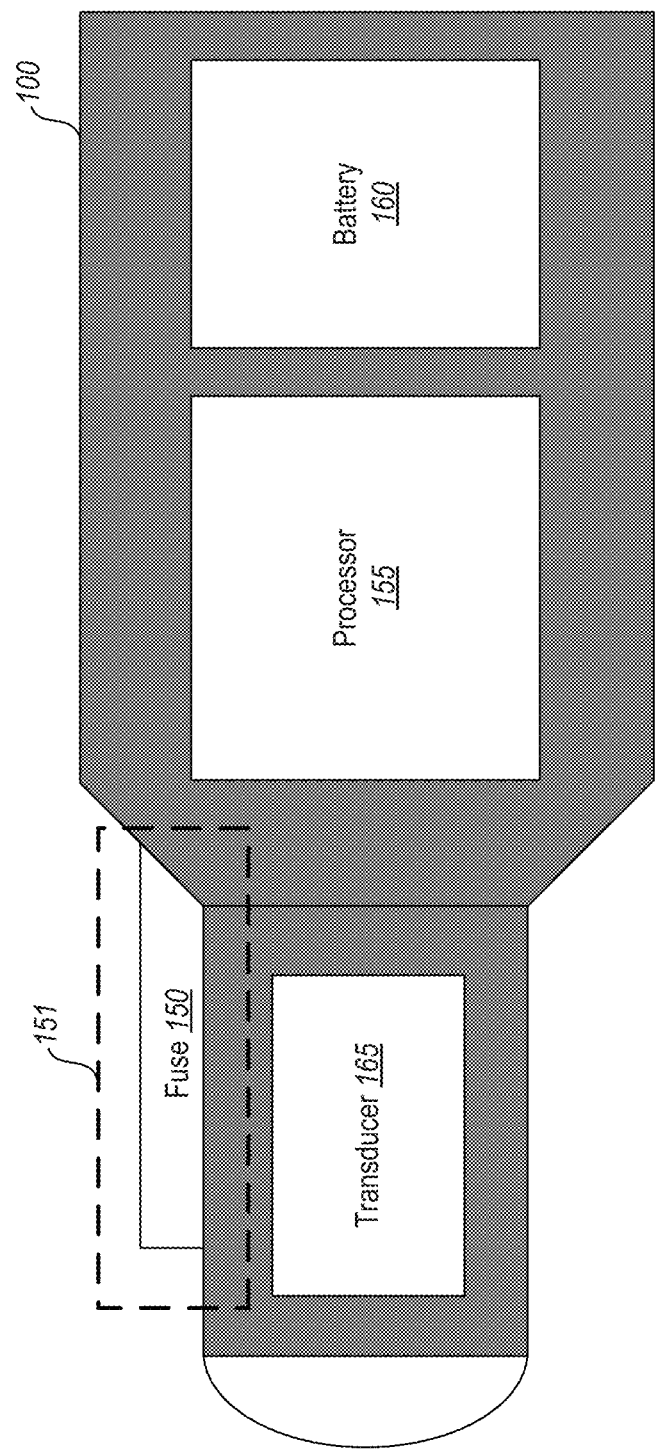

200
ACOUSTIC TAG HAVING A DIGESTIBLE FUSE

FIELD OF THE INVENTION

The present disclosure relates to tracking devices and, more particularly, to an acoustic tag for implantation into a first fish, the acoustic tag having a digestible fuse that is configured to detect consumption of the first fish including the implanted tag by the second fish.

BACKGROUND

Acoustic tags are small acoustic devices emitting a known frequency acoustic signal from tagged fish into the surrounding water. The acoustic signal is received at one or more hydrophones and is processed to provide a detection or positional track of the tagged fish over large areas. These tags typically include a piezoelectric transducer coupled to electronics and powered by batteries, all of which is overcoated with a biocompatible, relatively impervious urethane, or similar material. The electronics of the tag may include a processor chip that controls the parameters of the signal sent to the transducer and therefore allows for unique identification of individual tags. The signals are typically processed using hardware and software attached to or otherwise in communication with the hydrophones.

FIG. 1 illustrates operation of a prior art acoustic tag. In particular, FIG. 1 shows an acoustic tag 10 implanted in a subject fish 20. The acoustic tag 10 emits a signal 25 that is detected by a hydrophone 30. The hydrophone 30 may have electronics for processing and/or storing the signal or may communicate (e.g., send, transmit) the received signal 25 to a base station 35, which may include custom electronics, a personal computer, a laptop computer, or similar. Communication between the hydrophone 30 and the base station 35 may be via fixed media (e.g., wires), wireless, or some combination thereof. In some situations, multiple hydrophones may be deployed, such as in a hydrophone detection array.

Acoustic tags have been used to monitor fish movement for over 30 years. Initially, the size of the tag and the limitations of the electronics limited application of the technology. Since then, acoustic tags have been manufactured in increasingly smaller sizes and with greater processing capabilities, such that they are able to be used in a wide range of fresh water and marine applications.

As the science advances using this technology, researchers are trying to better understand how fish behave in a targeted environment. One particular area of interest is the effect of predation on smaller fishes, especially juvenile salmon smolts. Because predation can be a major cause of smolt mortality, being able to positively identify predation has become a major objective. To date the only way to tell if a smolt has been eaten is to study the fine-scale tracks for that tag and try to determine if the patterns are indicative of the swimming path of a predator as opposed to the smolt itself. This is inexact at best and almost impossible in simple hydrophone detection arrays.

FIG. 2 illustrates paths of predator and prey fish. In particular, FIG. 2 is a top view of a river 40. FIG. 2 further depicts a prey fish 20, such as a salmon smolt, and a predator fish 50. In this example, fish 20 is tagged as shown in FIG. 1. The predator fish 50 is also "tagged" in the sense that it has consumed a tagged prey fish, and the tag of the consumed fish remains active within the predator fish 50.

Each fish 20 and 50 has a respective track 22 and 52 that is based on the path or route taken by the fish through the river, as detected by a hydrophone array deployed in the river 40. When an acoustically tagged fish enters the hydrophone array, receptions on multiple hydrophones allow calculation of the position of the fish and, over time, a track of the fish's swimming path. Note that the track 52 of the predator fish 50 is different than the track 22 of fish 20. In particular, the track 22 of the fish 20 is substantially uniform in direction, such as may result from a salmon smolt migrating downstream towards the ocean. In contrast, the track 52 of the predator fish 50 wanders up and downstream, indicative of a predator-like foraging pattern. While categories of behaviors can be identified, and predator-like behavior may indicate that a tagged fish has been eaten, no absolutely definitive determination can be made regarding the fate of the originally tagged fish.

SUMMARY

One embodiment provides an acoustic tag for implantation in a first fish, the tag comprising a transmitter and a digestible fuse. The digestible fuse is configured to cause, when exposed to a digestive tract of a second fish, the transmitter to transmit a unique predation signal that indicates that the first fish has been eaten by the second fish. The digestible fuse is further configured to cause, before being exposed to the digestive tract of the second fish, the transmitter to transmit a pre-predation signal that is different from the predation signal and that indicates that the first fish has not been eaten.

Another embodiment provides a system for studying fish predation. Such a system may include a receiving system, an acoustic tag including a digestible fuse, and one or more hydrophones configured to detect signals transmitted by the acoustic tag.

BRIEF DESCRIPTION OF THE DRAWINGS

Preferred and alternative examples of the present invention are described in detail below with reference to the following drawings:

FIGS. 3A and 3B illustrate operation of an enhanced acoustic tag according to an example embodiment;

FIG. 4 is a block diagram of an enhanced acoustic tag according to an example embodiment;

DETAILED DESCRIPTION

Example embodiments provide an enhanced acoustic tag. The enhanced acoustic tag is implanted in a subject fish, such as a salmon smolt. The enhanced acoustic tag is configured to detect ingestion or consumption of the subject fish by a predator fish. Typical tags detect ingestion based on the presence of conditions, properties, or substances that occur within the digestive tract of a predator fish. Some embodiments use a digestible fuse that is configured to dissolve in the presence of enzymes that are present in the stomach of a predator fish.

When the digestible fuse dissolves, a circuit is opened that causes the enhanced acoustic tag to transmit a signal that indicates that the subject fish has been eaten by a predator fish.

Figure 1:
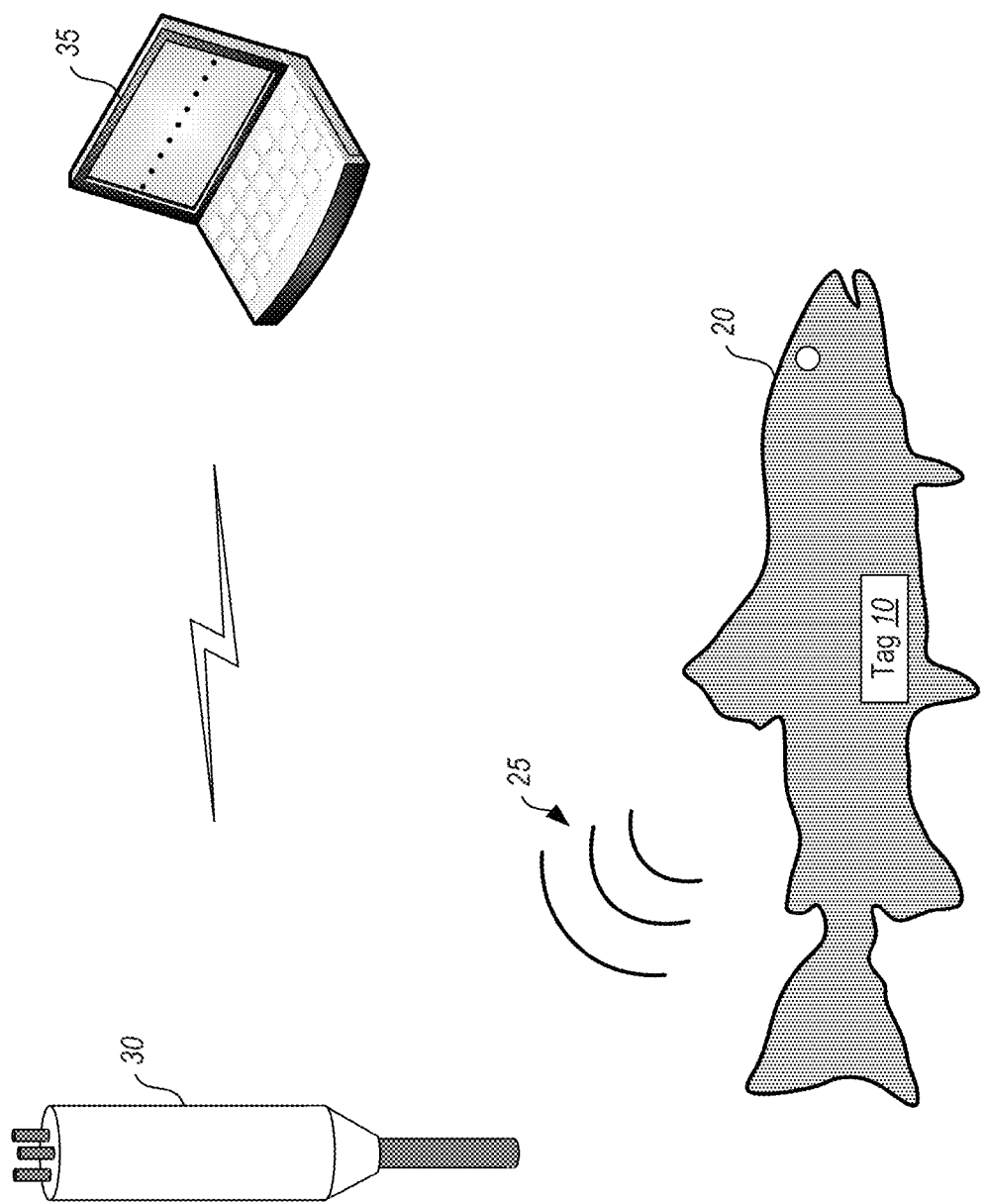
FIG. 1 illustrates operation of a prior art acoustic tag.
Figure 2:
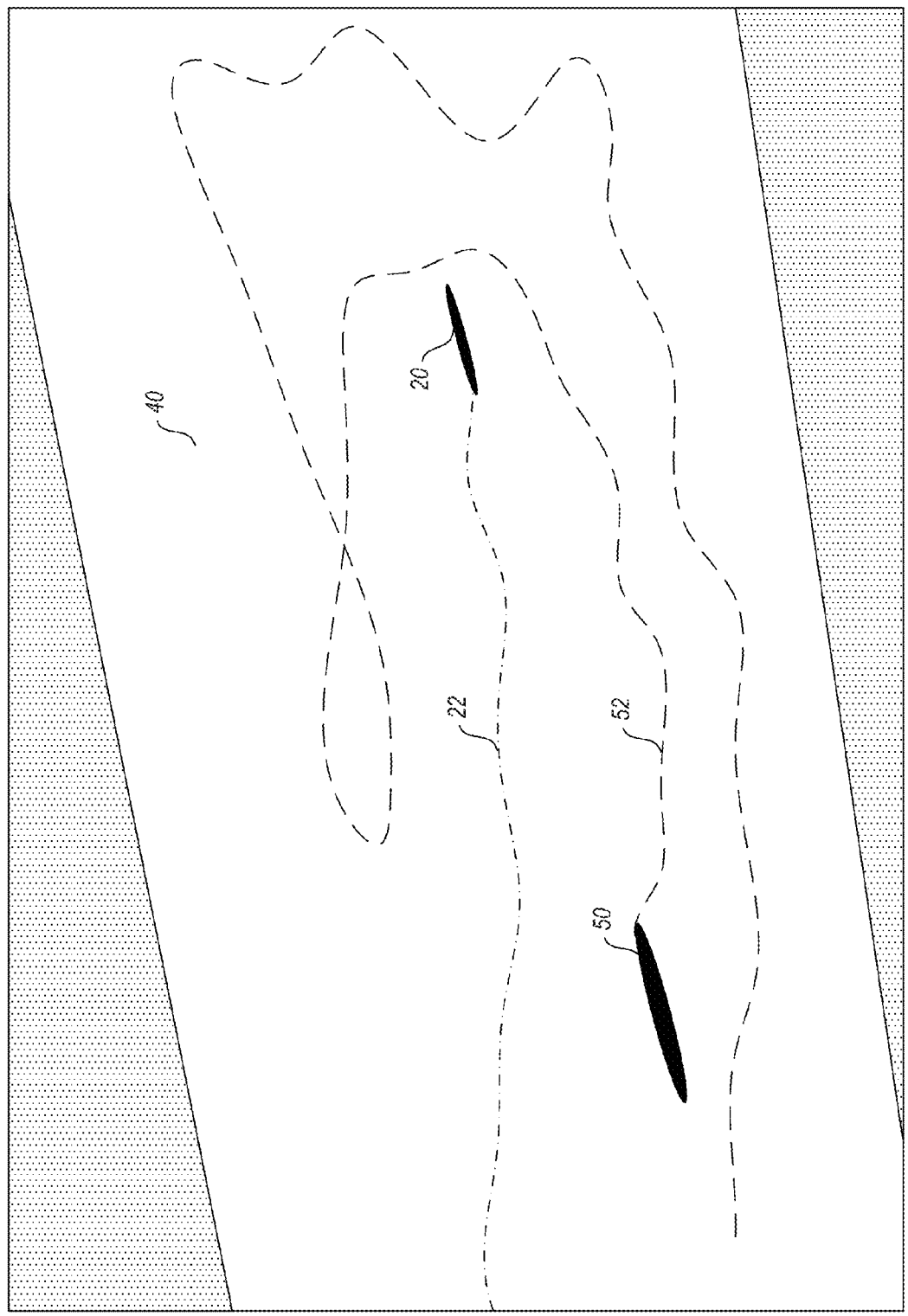
FIG. 2 illustrates paths of predator and prey fish.
Figure 3A:
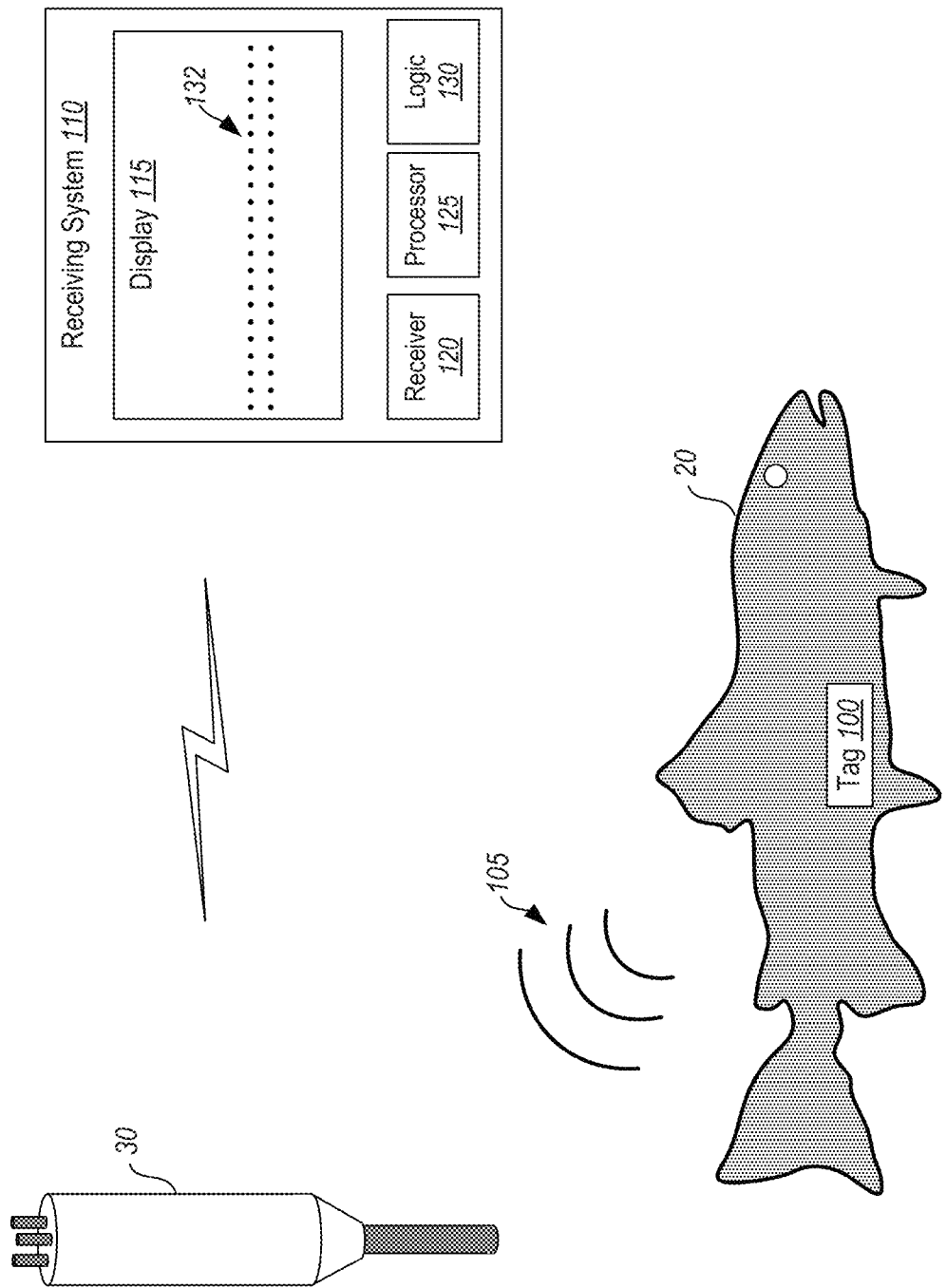

FIGS. 3A and 3B illustrate operation of an enhanced acoustic tag according to an example embodiment. In FIG. 3A, an enhanced acoustic tag 100 is implanted in a fish 20. Typically, the tag 100 is implanted in the body cavity of the fish 20, although in other embodiments it may be attached to the exterior of the fish. The tag 100 transmits a first signal 105 (also called a "pre-predation signal") to a hydrophone 30. The hydrophone 30 communicates the received signal 105 (or information based thereon) to a receiving system 110. The receiving system 110 displays a graphical depiction 132 of the received information on a display 115. The graphical depiction 132 may present the signal 105 in various ways, including by presenting an identifier (e.g., number) associated with the tag 100, a signal sequence, a two or three dimensional track, or the like.

In FIG. 3B, the fish 20 having the implanted tag 100 has been eaten by a predator fish 50. As noted above, and as will be described further below, the tag 100 is configured to detect conditions or substances that are present in the stomach of the predator fish 50, such as digestive enzymes, pH levels, or the like. When the triggering condition is detected, the tag 100 transmits a second signal 107 (also called a "predation signal") to the hydrophone 30. The hydrophone 30 communicates the received signal 107 (or information based thereon) to the receiving system 110, where it may be displayed as a graphical depiction 134 (or stored). Note that the graphical depictions 132 and 134 (and the underlying detection logic) differ, thereby reflecting the presence of the predation signal 107 emitted by the tag 100 in the scenario of FIG. 3B, as opposed to the pre-predation signal 105 emitted by the tag 100 in the scenario of FIG. 3A. Note also that in some embodiments, instead of displaying the received signal 107, the system 110 stores, logs, or records the signal 107 so that it can be analyzed and/or displayed at a later time and/or by some other system or device.

The receiving system 110 shown in FIGS. 3A and 3B comprises a display 115, receiver 120, a processor 125, and logic 130. The receiver 115 is configured to receive from the hydrophone 30 information based on the signals 105 and 107. For example, the receiver 115 may be in wire line communication with the hydrophone 30 or in wireless communication with a transmitter (not shown) coupled to the hydrophone. The processor 125 executes the logic 130 to extract information (such as presence or location) from the signal. The information may be stored or configured to present the graphical depiction 132 or 134 of the received information on the display 115.

The receiving system 110 may be implemented in conjunction with a conventional computing system, such as a laptop computer, desktop computer, tablet computer, mobile device or the like. Typically, some custom electronics may be required in addition to the computing system used to process the signal from the hydrophone. The computing system may include custom or standard interface units. For example, the receiver 120 may be a radio-frequency signal receiver or card, a wireless network card (e.g., a Wi-Fi transceiver), or the like. The logic 130 may be software instructions and/or data stored on a computer-readable storage medium (e.g., a hard disk, Flash drive) of the receiving system 110. The stored instructions cause the processor 125 to perform functions including receiving, formatting, storing, and/or presenting information received from the hydrophone 30 or other sources.

Other implementations of receiving system 110 are contemplated. For example, the receiving system 110 may be a special purpose tracking and display device configured to perform tag tracking and related functions. In other embodiments, the receiving system may not include one or more of the illustrated components. For example, the receiving system 110 may not include a display 115, and instead be configured to record or log tracked information for later presentation or analysis by some other system or device.

FIG. 4 is a block diagram of an enhanced acoustic tag according to an example embodiment. In particular, FIG. 4 depicts an enhanced acoustic tag 100 comprising a digestible fuse 150, a processor 155, a battery 160, and a transducer 165. The area 151 is shown in an enlarged view in FIGS. 5 and 6 and described below. The tag 100, with the exception of the digestible fuse 150, is coated with polyurethane that is relatively impervious to water and the strong stomach acid and enzymes in the fish gut.

In some embodiments, the tag 100 is configured to transmit two different signals depending on whether or not the tag 100 has been consumed by a predator fish. In an initial configuration, the tag 100 transmits a first signal (the "pre-predation signal"). This signal may encode an identifier of the tag 100, so that the tag may be distinguished from other nearby tags. The identifier of the tag 100 may be stored in various ways, such as in a memory or other storage device or circuit included in the tag 100. In some embodiments, the identifier may be set remotely, such as upon tag activation. In other embodiments, the identifier is fixed upon tag manufacture.

As will be discussed further below, the digestible fuse 150 is affixed to the tag 100 and coated in such a way as to allow the fuse coating to be quickly digested in the predator's stomach. This in turn causes the digestible fuse 150 to disintegrate, resulting in an open circuit. The processor 155 and associated electronics in the tag 100 senses the open circuit and in response transmits a second signal (the "predation signal"). The second signal may also encode the identifier of the tag, but will further include a distinguishing feature that indicates that predation has occurred.

The tag 100 may include software instructions and/or data stored on a computer-readable storage medium (e.g., a read-only memory). The stored instructions cause the processor 155 and any associated electronics to perform functions related to the operation of the tag 100. Such function may include signal generation and transmission (e.g., driving the transducer 165), signal encoding (e.g., timing signal pulse intervals or periods), detecting whether the fuse 150 has disintegrated (e.g., by sensing whether the circuit formed by the fuse is open or closed), and the like.

A variety of techniques may be employed to implement and/or provide the components, modules, or functions of the tag 100 and/or the receiving system 110. For example, some or all of the functions may be implemented at least partially in firmware and/or hardware, including, but not limited to one or more application-specific integrated circuits ("ASICs"), standard integrated circuits, controllers executing appropriate instructions (e.g., microcontrollers and/or embedded controllers), programmable logic arrays ("PLAs"), field-programmable gate arrays ("FPGAs"), complex programmable logic devices ("CPLDs"), and the like. Some or all of the components and related data may also be stored as contents (e.g., as executable or other machine-readable software instructions or structured data) on a computer-readable medium. A computer-readable medium includes any medium, circuit, or substrate that is configured to store or represent information in digital or analog form in a manner that is readable by a computer processor, an electronic circuit, a physical device, or the like. Non-limiting examples of computer-readable media include volatile memory such as a RAM; read only memory such as a ROM, EPROM, EEPROM; flash memory; hard disks; portable media articles to be read by an appropriate drive or via an appropriate connection, such as a CD-ROM, DVD, or flash memory device; or the like. In typical embodiments, the stored contents of a computer-readable medium enable or configure one or more associated computing systems, devices, or circuits to execute, interpret, or otherwise process the stored contents to perform at least some of the described techniques. In some embodiments, the stored contents are instructions to be processed by a general purpose processor (e.g., a CPU). In other embodiments, the stored contents include data that is used to configure a reconfigurable logic circuit, such as a PLA, CPLD, FPGA, or the like. Some or all of the components and/or data structures may be stored on tangible, non-transitory storage mediums. The described computer program products may also take other forms in other embodiments. Accordingly, embodiments of this disclosure may be practiced with other computer system/device configurations.

Figure 5:
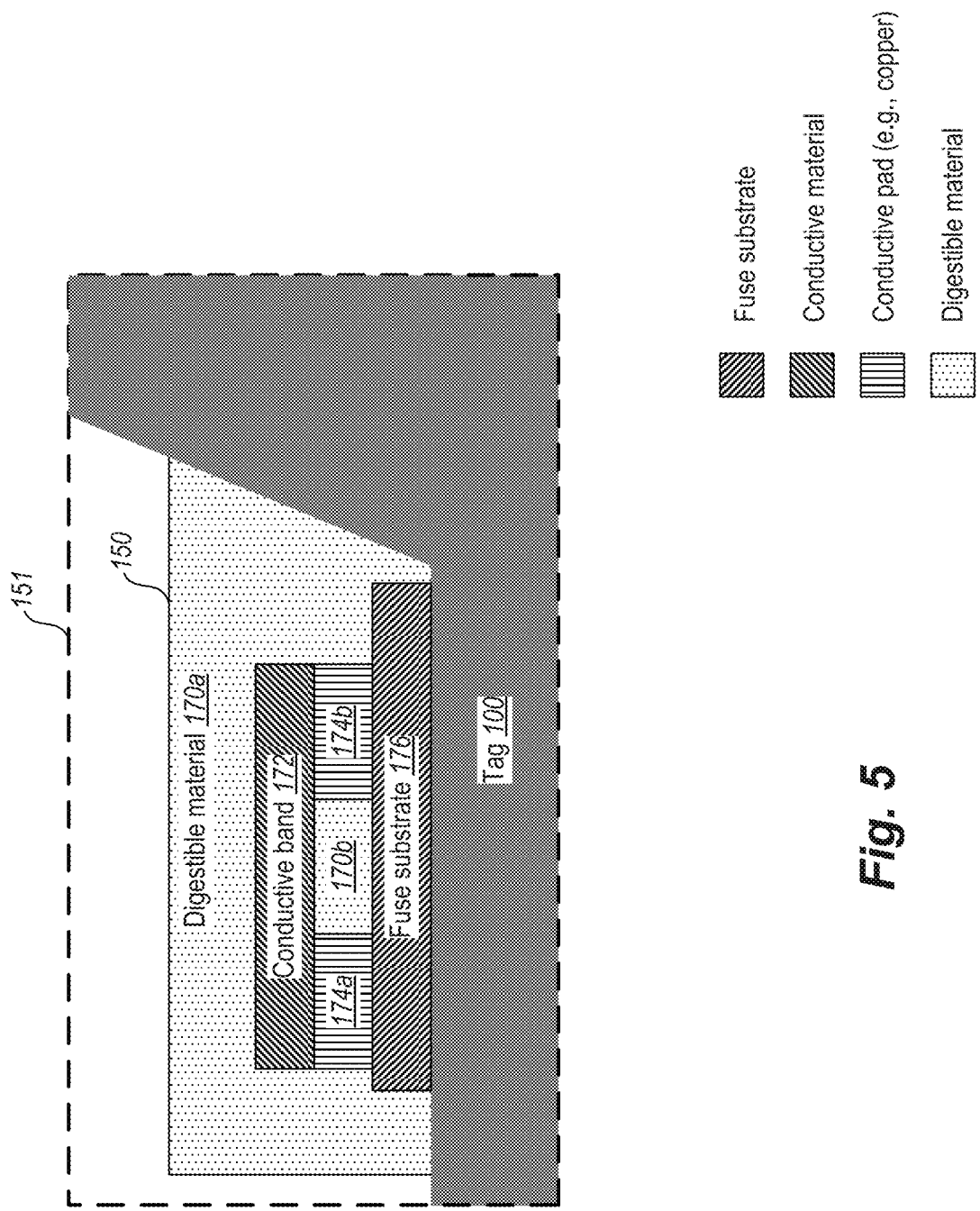
FIG. 5 is a block diagram of an example digestible fuse in an undigested configuration.

FIG. 5 is a block diagram of an example digestible fuse in an undigested configuration. In particular, FIG. 5 provides an enlarged side view of the digestible fuse 150. The fuse 150 is constructed in a layered manner starting at the bottom with a fuse substrate 176 attached to the main body of the tag 100. The fuse substrate is an insulating material such as fiberglass, Kapton, etc. A first conductive pad 174*a* and a second conductive pad 174*b* are mounted upon the fuse substrate 176. The conductive pads 174*a* and 174*b* are separated by a region of digestible material 170*b*. The conductive pads 174*a* and 174*b* are each connected to a wire conductor (not shown) that passes through the fuse substrate 176 and into the tag 100. The conductive pads 174*a* and 174*b* may be made from various conductive materials. In one preferred embodiment the underlying traces are copper, but the exposed portions of the circuit (i.e. the pads in this case) may be plated with gold, silver, nickel, tin, or the like, or any number of rare earth alloy combinations.

A conductive band 172 overlays and connects the two conductive pads 174*a* and 174*b*. The conductive band 172 thereby forms an electrical circuit across the two conductive pads 174*a* and 174*b*. Various materials may be used for the conductive band 172. One embodiment uses graphite, although other materials can be employed, such as gold, silver, and the like.

The fuse assembly is coated with a layer of digestible material 170*a*. The digestible material 170*a* and 170*b* can be quickly digested by the pepsin enzyme in a predator fish's stomach. This in turn causes conductive band 172 to disintegrate resulting in an open circuit between the conductive pads 174*a* and 174*b*. The processor 155 and associated electronics in the tag 100 senses the open circuit and in response, initiates transmission of the predation signal.

Note that the conductive band 172 is suspended over digestible material 170*b* in a "bridge-like" manner between the conductive pads 174*a* and 174*b*. Having layers of digestible material above and below the conductive band 172 assists in the operation of the fuse 150. More specifically, when exposed to the predator's digestive tract, the digestible material 170*b* underneath the conductive band 172 dissolves, thereby removing supporting structure and facilitating disintegration of the conductive band 172.

Figure 6:
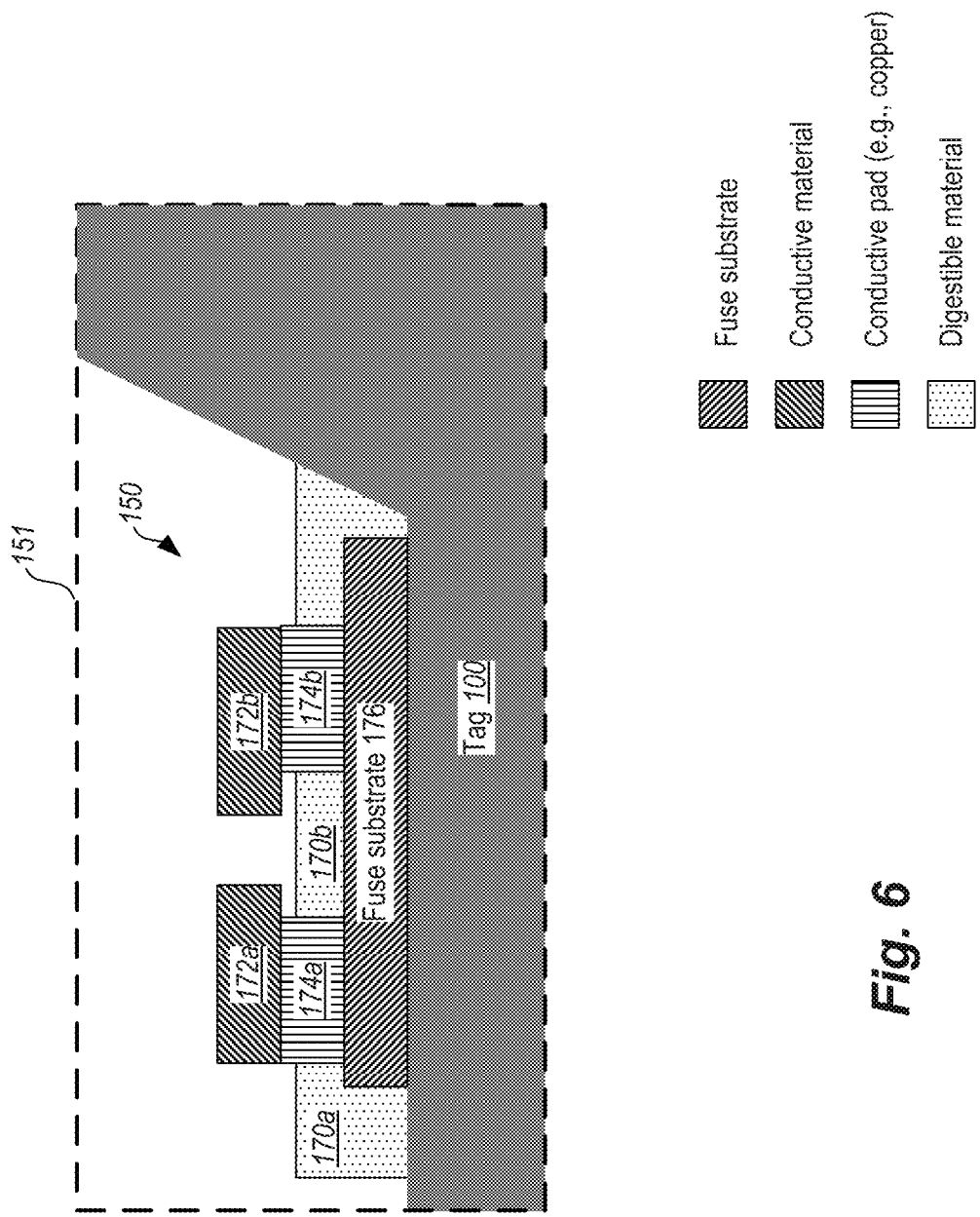
FIG. 6 is a block diagram of an example digestible fuse in a digested configuration.

FIG. 6 is a block diagram of an example digestible fuse in a digested configuration. In FIG. 6, the digestible material 170*a* and 170*b* has substantially dissolved, thereby exposing the conductive band 172 to the predator fish's digestive tract. The conductive band 172, upon exposure to the liquid environment of the predator's digestive tract, has disintegrated into two portions 172*a* and 172*b*, thereby breaking the circuit across the conductive pads 174*a* and 174*b*.

In one embodiment, the digestible material 170 is a chitosan-based film or gel. Chitosan is a polysaccharide that is digestible by stomach enzymes but will not dissolve in other body fluids (e.g., saline). Other embodiments may use other digestible materials such as gelatin- or starch-based mixtures that are stable in water but that will dissolve when exposed to conditions or substances present in a predator's digestive tract. Some embodiments may use a formulation (e.g., enteric coating) that will dissolve when exposed to particular levels of acidity present in the various stages of a digestive tract.

In some embodiments, a method or process of digestible fuse manufacture is provided. First, a low-resistance graphite band consisting of graphite is sandwiched between layers of chitosan- or gelatin-based film and attached to wires. Second, the tag is assembled and coated with a urethane-based coating, leaving two wires extending from within the tag body, those wires respectively connected to positive and negative poles of an electric power source within the tag. Third, the fuse is laid down onto the tag, and wires from the fuse attached to corresponding wires extending from the tag. Fourth, the entire assembly (tag and fuse) is then overcoated with the chitosan mixture and dried.

Figure 7:
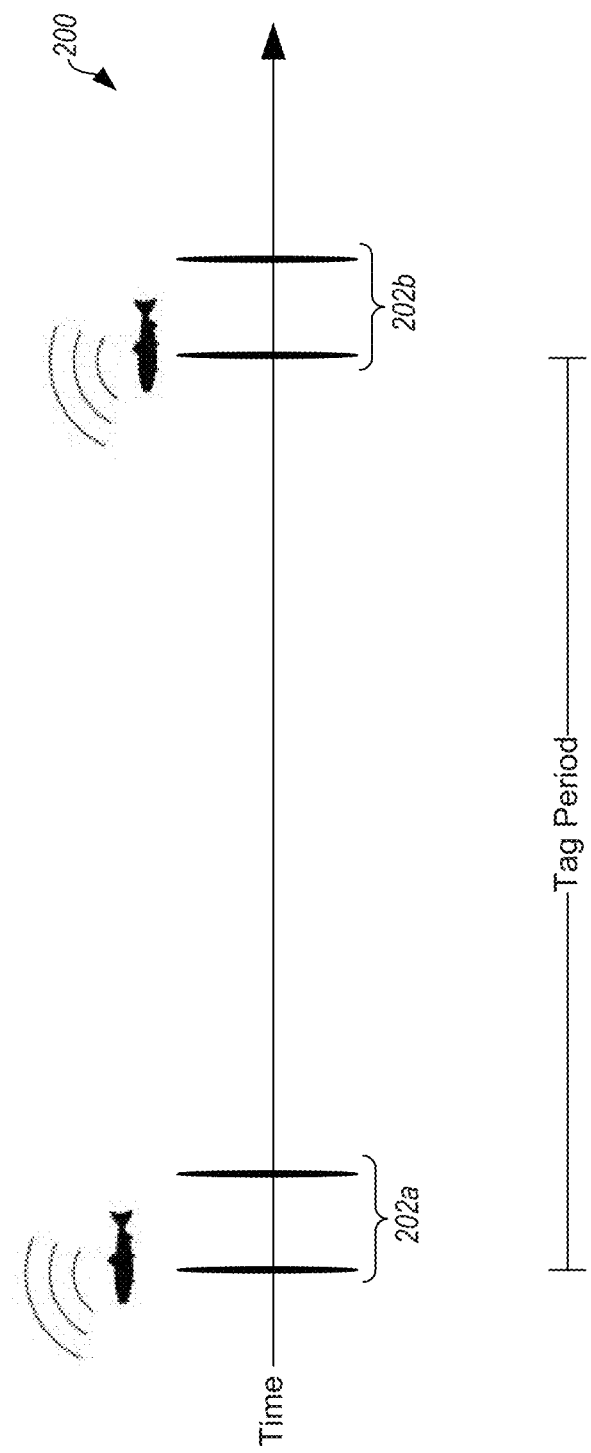
FIG. 7 illustrates a pulse sequence emitted by an enhanced acoustic tag according to an example embodiment.

FIG. 7 illustrates a pulse sequence emitted by an enhanced acoustic tag according to an example embodiment. FIG. 7 depicts a timeline 200 that illustrates signals transmitted by a tag implanted in a subject fish. In the illustrated embodiment, the tag is a "double-pulsed" tag in that it transmits a double pulse (202*a* and 202*b*) at regular intervals. Double-pulsed signals include a primary and a secondary pulse that are separated by a pulse width. The delay between primary and secondary pulses as well as the tag period can be used to identify a tag. Other tags are "single-pulsed" in that they emit a single pulse at regular intervals and there are multiple other signaling methods that could also be used for tag identification. The tag utilizes pulse-rate encoding, the interval ("tag period") between each transmission, to detect and identify a tag. The pulse-rate is precisely measured from the arrival time of one pulse to the arrival time of the next pulse in sequence. The timing of the start of each transmission is precisely controlled by the processor within the tag.

The enhanced tag can be uniquely programmed thereby allowing tags to be individually identified. Programmable parameters include pulse width (e.g., the duration of each pulse), primary and secondary pulse separation, tag period, and type of signal used for the pulse (e.g., a continuous wave pulse of a given duration). For double-pulsed tags (as illustrated in FIG. 7), the secondary pulse can be programmed to ping in any of 31 "slots" between the primary pings, thereby providing a large number of unique tag identifiers (e.g., about 60,000 in one embodiment). Once the parameters are set, the tag will continue to pulse at those settings until it is turned off or the batteries die. Some embodiments utilize Barker encoding for the signal pulse in order to provide high-resolution arrival time measurement and high signal-to-noise ratio. These innovations combine to provide an acoustic tag with increased detection ranges, improved signal-to-noise ratios and pulse-arrival resolution, and decreased position variability when compared to other types of acoustic tags.

Figure 8:
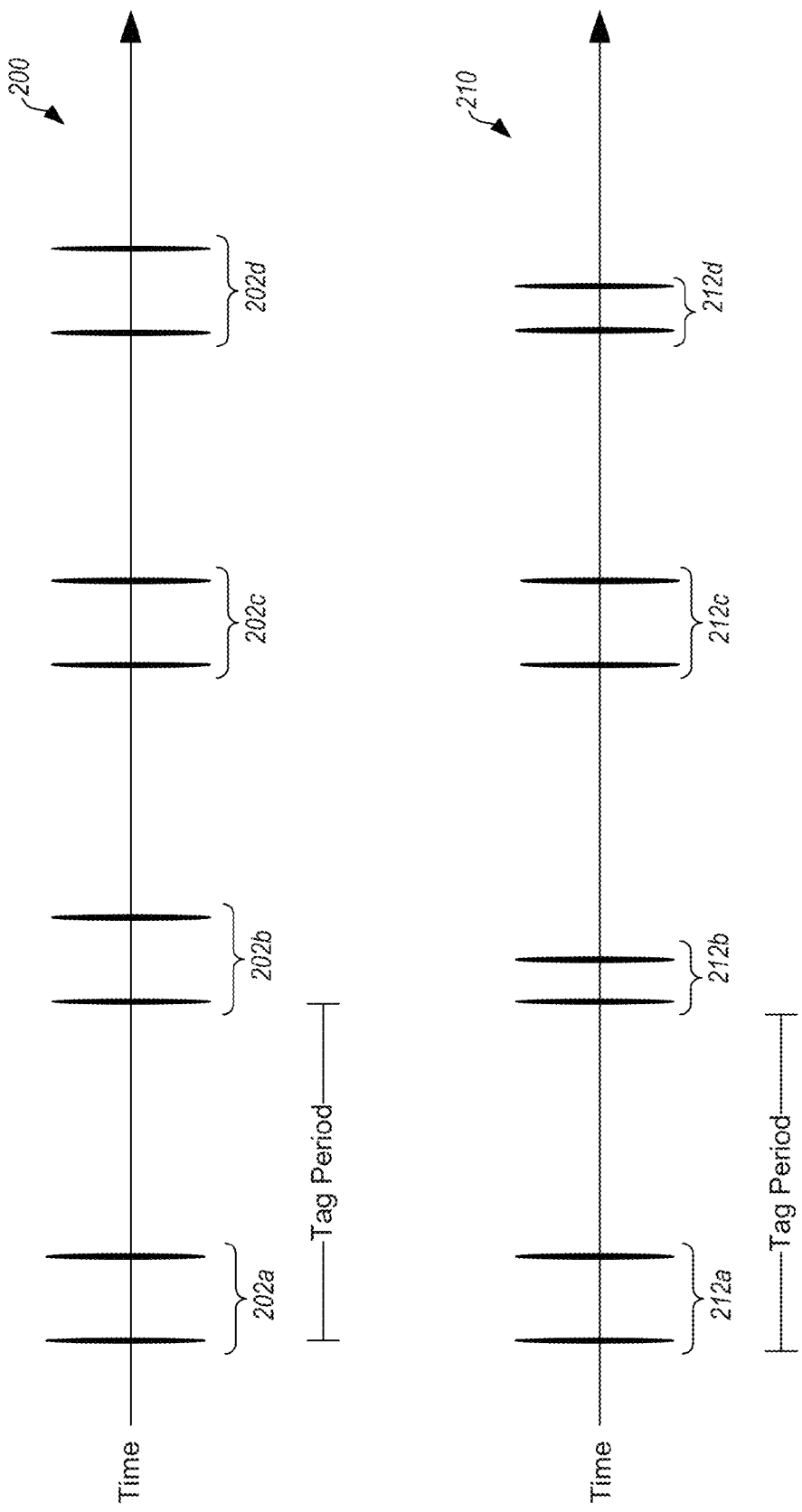
FIG. 8 compares pre-predation and predation pulse sequences emitted by an enhanced acoustic tag according to an example embodiment.

FIG. 8 compares pre-predation and predation pulse sequences emitted by an enhanced acoustic tag according to an example embodiment. In particular, FIG. 8 depicts two timelines 200 and 210. Timeline 200 is described with respect to FIG. 7, above, and represents a pre-predation signal. In the pre-predation condition, the tag emits a pre-predation signal comprising, in this embodiment, a series of uniformly spaced pulse pairs (202a-202d), where the spacing between pulse pairs (the "tag period") identifies the tag.

Timeline 210 represents a predation signal. The predation signal shown in timeline 210 is emitted when the tag fuse disintegrates in the digestive tract of a predator fish, as discussed above. Upon disintegration of the tag fuse, the tag transmits a predation signal comprising, in this embodiment, a series of alternating pulse pairs 212a-212d. Alternate pairs of the sequence 212a-212d (specifically, pairs 212a and 212c) have the same primary-secondary pulse spacing as the pulse pairs 202a-202d of the pre-predation signal. Pairs 212b and 212d have a secondary pulse in an unused slot, indicating that predation has occurred. Note that the tag period in the predation signal is the same as the tag period in the pre-predation signal. This fact, coupled with the observation that the primary-secondary spacing of pulse pairs 212a and 212c matches the primary-secondary spacing of the pulse pairs 202a-202d of the pre-predation signal, additionally allows recovery of the original tag identifier.

Other coding methods could also be adapted to use this fuse in a similar manner. For example, some embodiments may not transmit any signal in a pre-predation condition. As another example, in a single-pulsed embodiment, the tag period may be set to a predetermined value in order to reflect that predation has occurred. Other embodiments may alternate (e.g., every 5 or 10 seconds) between two tag periods upon predation, such that a first tag period identifies the tag and the second tag period indicates that predation has occurred. In further embodiments, the signal pulse characteristics and/or encoding may be changed.

Figure 9:
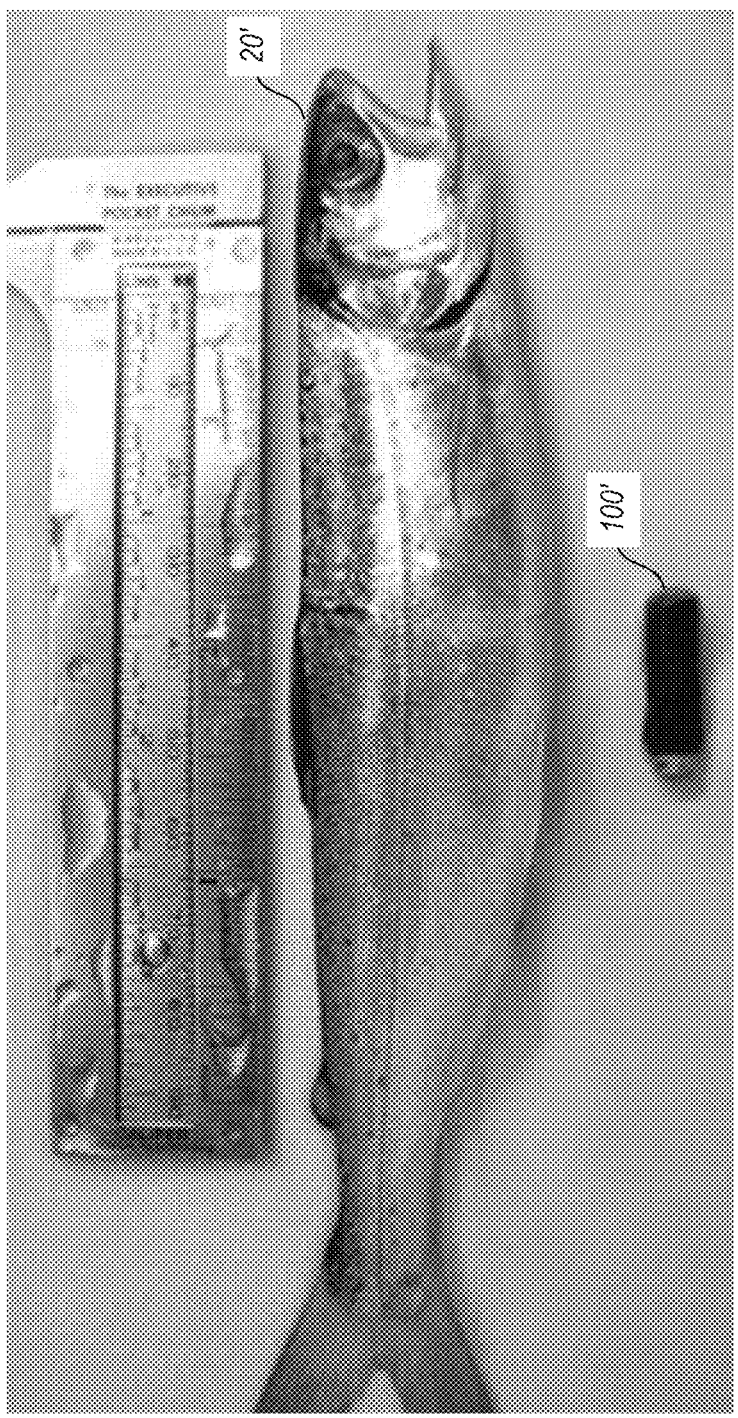
FIGS. 9 and 10 provide views of enhanced acoustic tags according to example embodiments.
Figure 10:

FIGS. 9 and 10 provide views of enhanced acoustic tags according to example embodiments. FIG. 9 is a photograph of a subject fish 20'. In this example, the fish 20' is a salmon smolt. The fish 20' is shown adjacent to an example enhanced tag 100'. In practice, the tag 100' is programmed and surgically implanted in the body of the fish 20'. Once the fish 20' has recovered from surgery it is released into the test environment and tracked.

FIG. 10 is a photograph of another example enhanced tag 100". The tag 100" is about 15 mm in length and weighs about 0.5 grams.

While the illustrated embodiments have been described primarily with respect to acoustic tags for use in fish predation studies, the described techniques and devices may be employed in other contexts as well. For example, the digestible fuse may be used in applications other than in the fisheries context, such as for tracking predation on land, for ingestible drug delivery or sensing devices, or the like. Digestible fuses may be used in tracking devices that are not acoustic tags, such as radio frequency-based (e.g., RFID) tags.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiment of the invention in which an exclusive property or privilege is claimed are defined as follows:

1. An acoustic tag for implantation in a first fish, the tag comprising:
    a transmitter; and
    a digestible fuse that is configured to:
        cause, when exposed to a digestive tract of a second fish, the transmitter to transmit a predation signal that indicates that the first fish has been eaten by the second fish; and
        cause, before being exposed to the digestive tract of the second fish, the transmitter to transmit a pre-predation signal that is different from the predation signal and that indicates that the first fish has not been eaten.

2. The acoustic tag of claim 1, wherein:
    the tag stores an identifier, and
    the pre-predation signal and the predation signal both encode the identifier such that the first can be uniquely identified both before and after the first fish is eaten by the second fish.

3. The acoustic tag of claim 1, wherein the digestible fuse comprises:
    a first layer of a digestible material;
    a second layer of the digestible material; and
    a layer of conductive material that is positioned above and in contact with the first layer of digestible material and that is positioned below and in contact with the second layer of digestible material.

4. The acoustic tag of claim 3, wherein the digestible material is insoluble in water and soluble in the digestive tract of the second fish.

5. The acoustic tag of claim 4, wherein the digestible material includes a polysaccharide.

6. The acoustic tag of claim 5 wherein the polysaccharide is chitosan or starch.

7. The acoustic tag of claim 4, wherein the digestible material includes gelatin.

8. The acoustic tag of claim 3, wherein the layer of conductive material is configured to close a circuit within the acoustic tag until the digestible material of the first and second layer is removed through digestive action of the second fish.

9. The acoustic tag of claim 3, wherein the conductive material includes graphite.

10. The acoustic tag of claim 3, wherein the conductive material includes gold or silver.

11. The acoustic tag of claim 1, further comprising:
    a transducer;
    a battery; and
    a processor configured to cause the transducer to emit acoustic signals, wherein:
    the digestible fuse comprises a conductor that forms a circuit powered by the battery and sensed by the processor,
    the conductor is substantially enveloped in digestible material that is configured to dissolve in the digestive tract of the second fish, and
    the conductor is configured to, after the digestible material dissolves, disintegrate when exposed to the digestive tract of the second fish, thereby opening the circuit sensed by the processor and causing the processor to transmit the predation signal.

12. The acoustic tag of claim 1, wherein:
    the pre-predation signal comprises a first series of pulse pairs, each pulse pair of the first series separated from a next pulse pair of the first series by a uniform pulse period that identifies the acoustic tag, and each pulse pair having a first pulse separated from a second pulse by a first pulse spacing,
    the predation signal comprises a second series of pulse pairs, each pulse pair of the second series separated from a next pulse pair of the second series by the uniform pulse period that identifies the acoustic tag, and the pulse pairs of the second series alternate between the first pulse spacing and a second pulse spacing, the second pulse spacing indicating that the first fish has been eaten by the second fish.

13. A system for studying fish predation, the system comprising:
an acoustic tag for implantation in a first fish, the tag comprising:
a digestible fuse that is configured to:
cause, when exposed to a digestive tract of a second fish, the tag to transmit a predation signal that indicates that the first fish has been eaten by the second fish; and
cause, before being exposed to the digestive tract of the second fish, the tag to transmit a pre-predation signal that is different from the predation signal and that indicates that the first fish has not been eaten; and
a receiving system configured to:
receive information about signals transmitted by the tag; and
record and/or present the received information.

14. The system of claim 13, further comprising:
multiple hydrophones each configured to detect acoustic signals transmitted by the acoustic tag; and
forward information about the detected acoustic signals to the receiving system.

15. A computer-readable storage medium including instructions that are configured, when executed by a processor in an acoustic tag for implantation in a fish and having a digestible fuse, to cause the processor to perform a method comprising:
monitoring a circuit formed by the digestible fuse;
when the circuit is in a closed state, prior to consumption of the fuse by a predator fish, transmitting a pre-predation signal that uniquely identifies the acoustic tag; and
when the circuit is in an open state, due to digestion of the fuse by the predator fish, transmitting a predation signal that is different from the pre-predation signal and that uniquely identifies the acoustic tag.

16. The computer-readable storage medium of claim 15, wherein the acoustic tag stores a unique identifier, and wherein the method further comprises encoding the unique identifier in the pre-predation signal and the predation signal.

17. The computer-readable storage medium of claim 15, wherein encoding the unique identifier in the pre-predation signal and the predation signal includes transmitting pulses at a frequency that is based on the identifier.

18. The computer-readable storage medium of claim 15, wherein encoding the unique identifier in the pre-predation signal and the predation signal includes transmitting pulse pairs, wherein each pulse pair has a pulse spacing based on the identifier.

* * * * *